Dec. 4, 1951   P. A. RILEY   2,577,270
CHARACTER PICTURE
Filed Aug. 4, 1949

INVENTOR
PHILIP A. RILEY
By *Toulmin & Toulmin*
ATTORNEYS

Patented Dec. 4, 1951

2,577,270

UNITED STATES PATENT OFFICE 2,577,270

CHARACTER PICTURE

Philip A. Riley, Dayton, Ohio, assignor to The Dolly Toy Company, Tipp City, Ohio, a corporation of Ohio Application August 4, 1949, Serial No. 108,610

2 Claims. (Cl. 40—126)

This invention relates to a character-picture, and particularly to a picture in which a theme or story is portrayed by means of individual characters that are arranged in a picture group for pictorial portrayal of a story or theme.

An object of the invention is to provide a picture group of characters arranged in a particular order by which a central theme or story will be portrayed by the arrangement of the characters of the picture group.

It is another object of the invention to provide a character-picture in accordance with the foregoing object wherein the characters of the picture give a third dimensional effect to the picture when arranged in a picture group.

It is still another object of the invention to provide a character-picture in accordance with the foregoing objects wherein the individual characters of the picture group are provided with hanging means for which each of them will hang in a predetermined attitude to establish a determined character arrangement of the characters and give a predetermined artistic flare to the picture group when hung on a wall.

Further objects and advantages will become apparent from the drawings and following description.

The purpose of this invention is to provide a character-picture consisting of a group of characters that are adapted to be suspended on a wall of a room so that when the group of characters is arranged in a particular arrangement of characters there will be portrayed a central theme or story. Pictures have been used to illustrate stories, and books of pictures can be found in which pictures are printed on paper sheets and bound in book form to give to stories a pictorial portrayal of the words of the story that accompany the picture.

In this invention the conventional printed page is forgotten and instead the character picture is constructed in such a manner that the characters of the picture are hung on a wall of a room in a predetermined artistic attitude with respect to each other, and which characters, when suspended on a wall of a room, will give to the picture a third dimensional effect.

The character-picture illustrated herein portrays the nursery rhyme "The Cat and the Fiddle."

Figure 1:
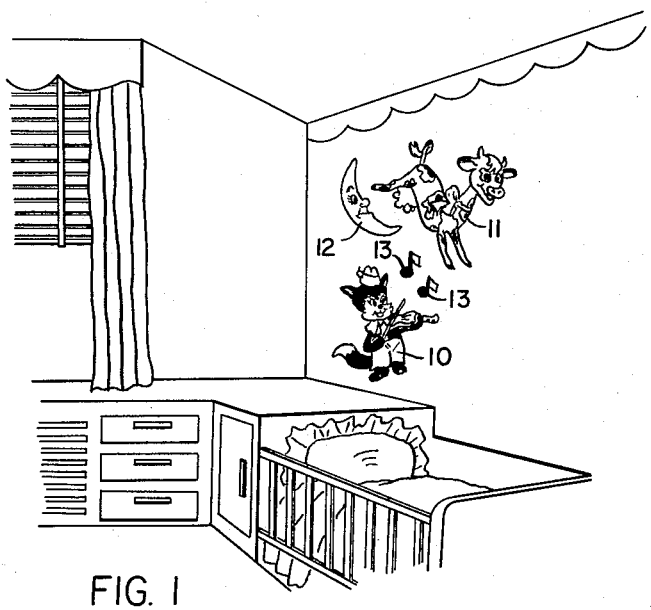
Figure 1 is a perspective view of a corner of a nursery room in which a character-picture of this invention is suspended on a wall of the room.

In Figure 1 the character-picture is illustrated in the manner in which it is suspended on a wall of a room, and since the character-picture is the portrayal of a nursery rhyme, a corner of a nursery is illustrated in Figure 1.

To portray the nursery rhyme "The Cat and the Fiddle" the character-picture consists of three principal characters of the nursery rhyme, the cat 10, the cow 11 and the moon 12. The cat 10 is illustrated as playing a "fiddle" with the musical notes 13 coming from the "fiddle."

Each of the characters, and each of the musical notes, are suspended on the wall of a room individually and are arranged in the group arrangement to illustrate the nursery rhyme that as the cat played the "fiddle," the cow jumped over the moon.

Figure 2:
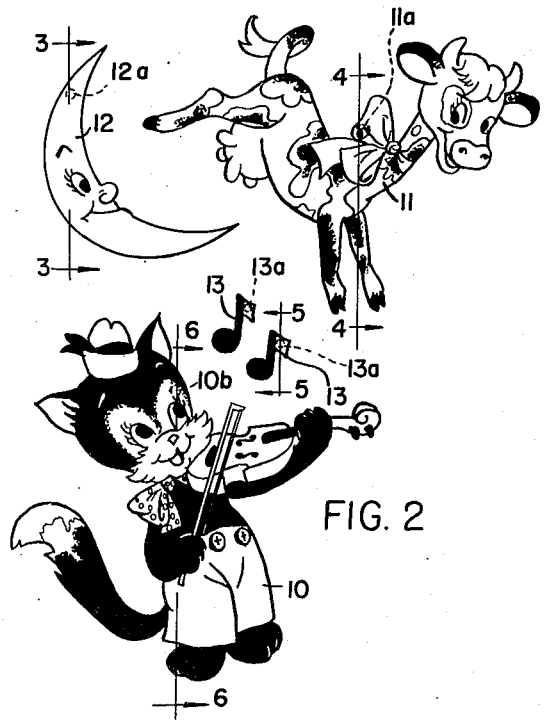
Figure 2 is a plan view of the character-picture of this invention.
Figure 3:
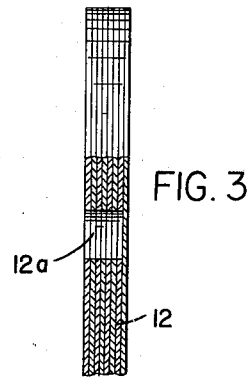
Figure 3 is a cross sectional view of the moon taken along line 3—3 of Figure 1.
Figure 4:
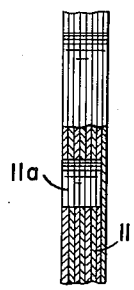
Figure 4 is a cross sectional view of the cow taken along line 4—4 of Figure 1.
Figure 5:
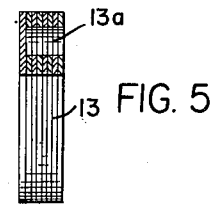
Figure 5 is a cross sectional view of one of the musical notes taken along line 5—5 of Figure 1.
Figure 6:
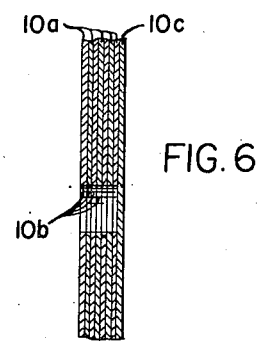
Figure 6 is a cross sectional view of the cat taken along line 6—6 of Figure 1.

Figure 2 illustrates the individual characters of the character-picture in more detail. For example, the cat 10 is composed of a plurality of heavy paper lamina, as illustrated by the cross section in Figure 6. The individual lamina 10a that comprise the body of the cat 10 are die cut to the shape of the cat illustrated in Figure 2. The lamina are then assembled together in stacked arrangement with all edges in alignment, and with adhesive applied between the lamina to secure them together.

Each of the lamina 10a are provided with a hole 10b that is located in the body of the lamina at a point so that the cat will assume the attitude illustrated in Figure 2 when suspended on a nail in a wall, the nail head being retained in the hole 10b. For example, the hole 10b is located just above the left eye of the cat.

The front lamina 10c of the cat 10 is die cut to the shape of the body of the cat in the same manner as the lamina 10a, but the hole 10b is not cut in the front lamina 10c. Thus, when the lamina 10a and 10c are assembled together, a clean hole 10b is provided through the body of the cat with the exception of the front lamina 10c.

The art work for the cat 10 is placed on the front lamina 10c, being either printed directly on the lamina or applied as a separate sheet by means of adhesive.

It will thus be seen that the body of the cat 10 is given a substantial thickness by the laminating of a plurality of individual sheets of heavy paper, one upon the other. Actually, the laminations of a full sized device make the body of the cat about three eights of an inch in thickness.

The cow 11 and the moon 12 together with the musical notes 13 are constructed in the same manner as the cat 10. The cow is provided with a hanging hole 11b placed in the "ribbon bow" on the neck of the cow so that it will hang in the attitude illustrated in Figure 2. Similarly, the moon 12 is provided with the hanging hole 12a and the musical notes with the hanging holes 13a so that they also will hang in the attitude illustrated in Figure 2.

The characters of the character-picture, each having a substantial thickness, give to the character-picture a third dimensional effect when the characters are suspended on a wall in a picture group arrangement illustrated in Figure 2, thus making the characters appear to stand out from the wall, and give to the picture an aesthetic effect that can not be obtained by a conventional printed sheet picture hung in a frame.

The character-picture of this invention illustrates only one form of the invention, but it will be appreciated that other nursery rhymes and other stories can be depicted by group arrangement of the principal characters of a story or nursery rhyme. Thus all modifications of the invention that fall within the scope of the appended claims are intended to be included herein.

Having thus fully described my invention, what I claim as new and desire to secure by Letters Patent is:

1. A character plaque for association with other character plaques to portray a story by the association of the plaques and adapted for free gravity suspension from a single point of suspension whereby to establish the plaque in a determined fanciful position relative to the vertical and relative to other plaques associated therewith, said plaque comprising a flat body of substantial thickness of the outline of the character depicted, said body having an opening therein projecting into said body from one side only thereof whereby said body closes one end of said opening which is adapted to receive a device for free suspension of the plaque therefrom on a wall, said opening being positioned in said body relative to the center of gravity of the body as hanging on a wall to position the body automatically in a fanciful position relative to the vertical and thereafter retain the position attained.

2. A character plaque for association with other character plaques to portray a story by the association of the plaques and adapted for free gravity suspension from a single point of suspension whereby to establish the plaque in a determined fanciful position relative to the vertical and relative to other plaques associated therewith, said plaque comprising a plurality of sheet laminae each cut to the outline of the character depicted and disposed in superposed bonded relation, each of said laminae having an opening therein aligned with the openings in the other of said laminae whereby to provide in said assembly an opening extending through said assembly, and another sheet lamina cut to the outline of the character depicted disposed on said assembly in superposed relation therewith and having an imperforate portion closing one end of said opening in said assembly, said opening being positioned in said assembly relative to the center of gravity of the assembly as hanging on a wall to position the assembly automatically in a fanciful position relative to the vertical and thereafter retain the position attained.

PHILIP A. RILEY.

REFERENCES CITED

The following references are of record in the file of this patent:

UNITED STATES PATENTS

| Number | Name | Date |
|---|---|---|
| 539,539 | Palmer et al. | May 21, 1895 |
| 1,751,176 | Rystrom | Mar. 18, 1930 |
| 1,811,320 | Kerr et al. | June 23, 1931 |
| 2,058,417 | Currie | Oct. 27, 1936 |
| 2,155,788 | Fulton | Apr. 25, 1939 |
| 2,325,710 | Schweitzer | Aug. 3, 1943 |

FOREIGN PATENTS

| Number | Country | Date |
|---|---|---|
| 3,475 | Great Britain | Aug. 27, 1880 |